May 26, 1964    T. S. MOULTON    3,134,397
ROTARY BOOM SPRINKLERS
Filed Nov. 14, 1960    6 Sheets-Sheet 1

INVENTOR
Thomas S. Moulton
BY Robert M. Dunning
ATTORNEY

INVENTOR
Thomas S. Moulton
BY Robert M. Dunning
ATTORNEY

May 26, 1964  T. S. MOULTON  3,134,397
ROTARY BOOM SPRINKLERS
Filed Nov. 14, 1960  6 Sheets-Sheet 3

INVENTOR
Thomas S. Moulton
BY Robert M. Dunning
ATTORNEY

INVENTOR
Thomas S. Moulton

United States Patent Office 3,134,397
Patented May 26, 1964

3,134,397
ROTARY BOOM SPRINKLERS
Thomas S. Moulton, Withrow, Minn.
Filed Nov. 14, 1960, Ser. No. 68,741
9 Claims. (Cl. 137—344)

This invention relates to an improvement in rotary boom sprinklers and deals particularly with a sprinkler including a central mast and oppositely directed booms mounted upon a suitable chassis for use in irrigating large areas in a short period of time. During recent years, it has been found feasible to mount rotary sprinklers upon wheeled chassis so that the sprinklers may be moved from one position to another. The sprinklers include sectional booms which extend outwardly in opposite directions from a central mast. The booms are provided with spaced sprinkler heads designed to effectively irrigate a circular area and to distribute the water evenly over the area. The booms are of sufficient length so that an area several hundred feet in diameter can be watered at one time.

While a number of such sprinklers have been produced, they have been found to have certain difficulties. For example, in usual practice the masts have been supported at one end of the supporting chassis making the structure impractical to move from one position to another without danger of tilting. The mast supporting means has usually not been particularly efficient, so that there is a tendency for the mast to bind in its support at certain points of its rotation, thus slowing down or stopping rotation at intervals and thereby distributing the water unevenly over the circular area. The means of supporting the mast so that it can be readily dismantled has in some instances been somewhat impractical, increasing the time and effort required in assembling and disassembling the booms and the mast. It is an object of the present invention to eliminate certain of these previous difficulties and to provide an improved type of boom sprinkler.

A feature of the present invention resides in a novel and effective manner of supporting the rotatable mast. The lower portion of the mast comprises a hollow tubular section through which the water is fed to the booms. In most instances, the water supply has been connected by an elbow to the lower end of the mast, making it necessary to support the mast at a point spaced above the lower end thereof. In the present construction, the lower end of the mast is closed and is supported upon a thrust bearing which acts to support the weight of the mast and at the same time to permit the free rotation thereof.

A further feature of the present invention resides in the provision of a novel means of directing the flow of water into the lower end of the mast. A hollow coupling encircles the lower portion of the mast and is sealed at its ends with respect thereto. The lower portion of the mast is provided with apertures communicating with the interior of the coupling and through which the water may flow. The coupling is provided with a radial extending inlet which may be rotated with respect to the mast so that the water supply line may extend either from the front or rear of the chassis, or from either side thereof.

A feature of the present invention resides in supporting the mast between the sides of the chassis and at a point midway between the ends of the chassis so as to be stabilized by the four chassis wheels. The mast support is tiltably supported by transversely extending pivots, the mast extending down into a mast supporting frame pivotally connected at its upper end to the chassis. Means are provided connected to the mast supporting frame near the lower end thereof for tilting the mast supporting frame with respect to the chassis. As a result, the mast may be supported in a vertical position even though the chassis is supported on an incline with one end of the chassis higher than the other and furthermore, the mast may be tilted to lower each end of the boom to simplify the disassembly thereof.

A further feature of the present invention resides in the provision of a means for locking the mast from rotation while the mast is in a selective rotative position with the booms extending either longitudinally of the chassis, or transversely thereof. As a result, the boom will not rotate while the chassis is being moved over the ground and act to tip over the sprinkler as the chassis moves over rough ground.

A further feature of the present invention resides in the provision of bearing wheels or rollers which are engageable with the lower portion of the mast at a point substantially spaced from the lower end thereof, these rollers holding the mast axially aligned with the supporting bearing and permitting free rotation thereof.

A further feature of the present invention resides in the provision of a novel means of leveling the chassis in the event the wheels on one side of the chassis are above the level of the wheels on the opposite side thereof. The chassis is formed with a central generally rectangular frame to which the mast supporting frame is hinged on a transverse axis. The wheels are supported by transversely extending wheel supporting frames which are pivotally connected to the central portion of the frame along aligned longitudinally extending axes. Means are provided for pivoting the wheel supporting frame relative to the chassis frame so that one or both of the wheel supporting frames may be held at an angle to the horizontal while the central portion of the frame is in a horizontal plane.

A further feature of the present invention resides in the provision of a device of the type described which may be moved in either longitudinal direction with equal ease. The chassis supporting wheels are supported by wheel supports pivoted to the ends of the wheel supporting frames on substantially vertical pivots, and the wheel supports are connected by tie rods to a plate pivotally connected to the center of the frame. The plate at either end of the frame may be locked with the wheels extending longitudinally of the chassis while a draw bar may be attached to the hinged plate at the opposite end of the chassis to permit the wheels connected thereto to turn in the customary manner.

A further feature of the present invention resides in the provision of a means for automatically releasing the water from the booms when the water supply is cut off. Due to the length of the booms, the water which is contained therein greatly increases the weight of the booms. If one boom is somewhat lower than the other when the water is cut off, due to improper leveling of the chassis or due to a change in position of the chassis after it has been leveled, the weight of water throughout the length of the boom may act to tilt the device. In the present arrangement, the water is automatically released when the water supply fails.

These and other objects and novel features of the present invention will be more clearly and fully set forth in the following specification and claims.

In the drawings forming a part of the specification.

Figure 1:
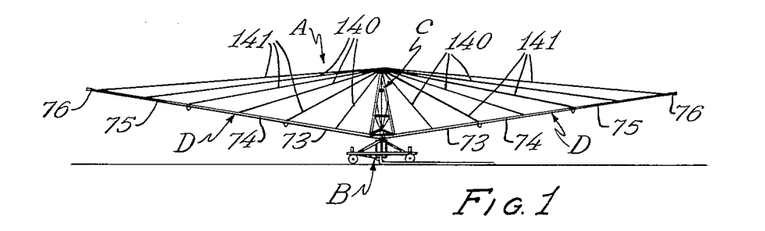
FIGURE 1 is a side elevational view of the apparatus in readiness for operation.

As indicated in FIGURE 1 of the drawings, the sprinkler A includes, in general, a wheel or supporting chassis B, an upright mast C, and a pair of oppositely directed boom arms D which extend in an upwardly inclined position from the mast C and are supported thereby. Due to the large size of the structure, the device can be shown only diagrammatically in its entirety, as in FIGURES 1 and 2.

Figure 14:
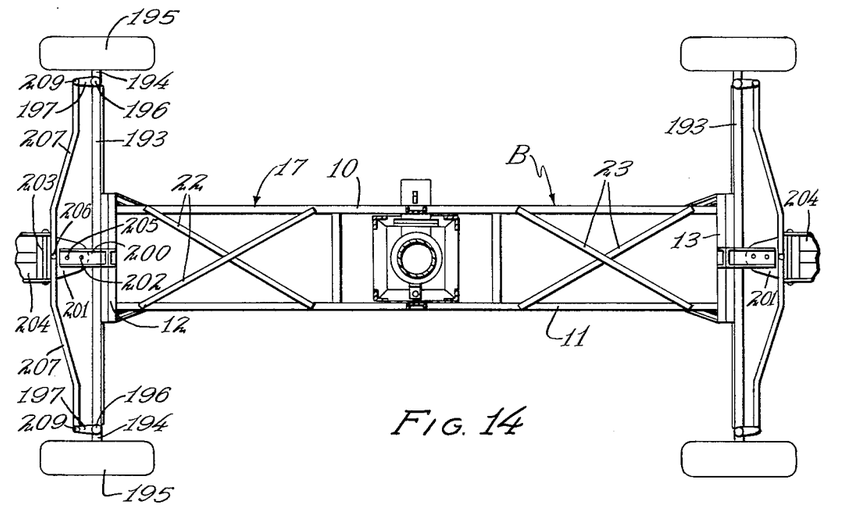
FIGURE 14 is a diagrammatic plan view of the chassis, the mast support and mast supporting braces being broken away to disclose the construction thereof.
Figure 15:
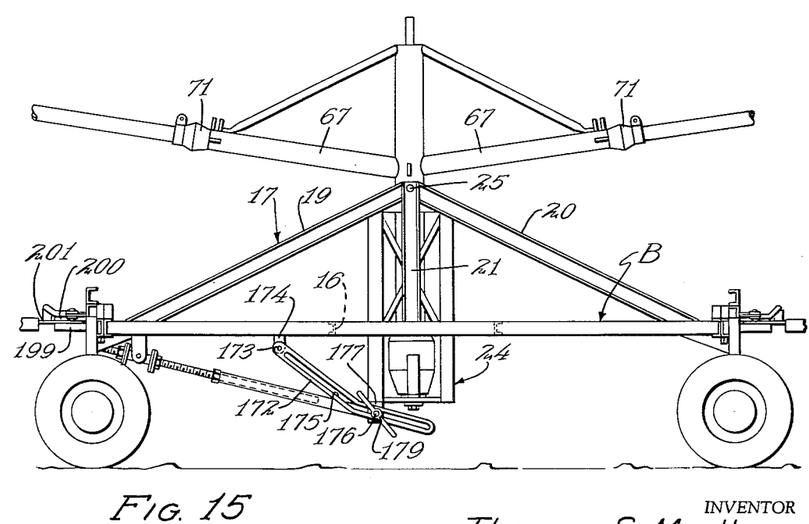
FIGURE 15 is a side elevational view of the chassis and of the lower portion of the mast.
Figure 16:
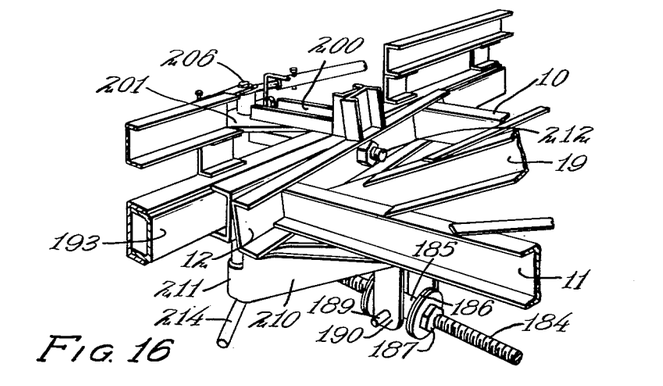
FIGURE 16 is a perspective view of a portion of the connection between the chassis and one of the transverse wheel supporting frames.
Figures 17, 18, 19, 20:
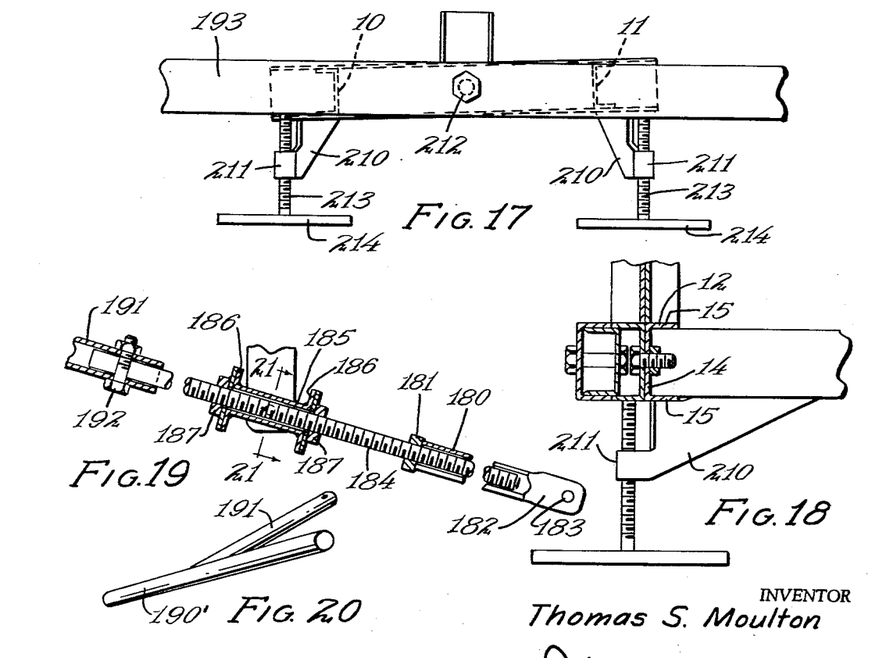
FIGURE 17 is a front elevational view of an end of the frame showing the manner in which the wheel supporting frame is adjusted relative to the center portion of the chassis.
FIGURE 18 is a vertical sectional view through a portion of a connection between the wheel supporting frame and the central portion of the chassis.
FIGURE 19 is a diagrammatic sectional view through the member employed for tilting the mast support.
FIGURE 20 is a perspective view of the device employed for operating the mast tilting frame.

With reference first to the supporting chassis B, as indicated in FIGURES 14 and 15 of the drawings, the chassis includes a pair of frame members 10 and 11 which are preferably of channel shaped form, the ends of which are connected by transverse channels 12 and 13 arranged with the bases of these members directed toward the ends of the chassis. As indicated in FIGURES 16 and 18 of the drawings, these connecting members such as the member 12 are arranged with the channel bases 14 extending in vertical planes and the side flanges 15 of the channels directed inwardly toward the center of the chassis. The chassis may be further braced by intermediate transverse braces such as 16.

A truss 17 extends upwardly from each of the frame sides 10 and 11, each truss 17 including a pair of upwardly converging channels 19 and 20 which are connected together at their upper ends and which are further supported at their point of connection by vertical channels 21. The lower or outer ends of the channels 19 and 20 are welded or otherwise secured to the truss frames 17 and are further reinforced by diagonally extending cross braces 22 and 23 which are welded or otherwise secured thereto.

Figure 10:
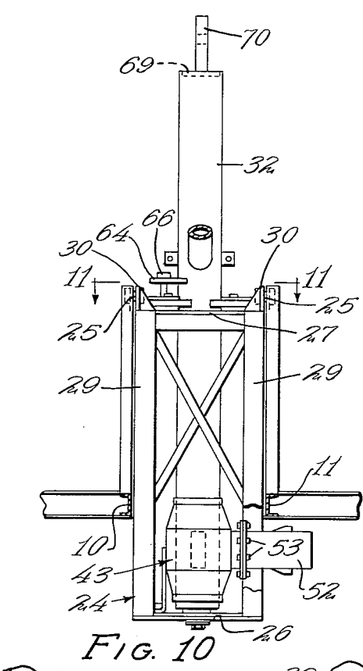
FIGURE 10 is a sectional view through the chassis, showing the mast supporting frame.

A mast supporting frame 24 is pivotally connected by aligned pivots 25 to the upper extremity of the truss 17. The frame 24 includes a rectangular lower bearing plate structure 26 and an upper end plate 27 of similar outline, the corners of the plates 26 and 27 being welded to vertical parallel angle members 29 which hold the plates 26 and 27 in parallel relation. Parallel plates 30 extend upwardly from the upper plates 27, and the aligned pivots 25 extend through the upper ends of the vertical channels 21 and through the gusset plates 30 to swingably support the frame 24. The frame 24 acts as a support for the mast and for the booms connected thereto.

Figure 13:
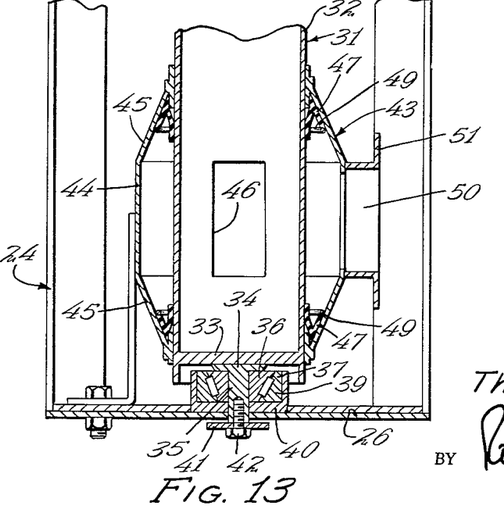
FIGURE 13 is a sectional view through the lower portion of the mast, showing the mast supporting bearing and the inlet coupling.

The mast 31 includes a tubular lower section 32 which is closed near its lower end by a closure and bearing plate 33 arranged on a plane normal to the axis of the mast. A disc 34 having an axial shaft 35 projecting therefrom is welded to the under surface of the bearing plate 33 in axial alignment with the tubular member 32. The shaft 35 extends through the inner race 36 of a thrust bearing 37, the outer race 39 of which is supported in a cup-shaped socket 40 on the bottom plate 26 of the frame 24. A washer 41 is secured to the lower end of the shaft 35 by means of an axially extending bolt 42, the washer 41 being positioned below the bearing plate 26 of the frame 24. A coupling 43 encircles the lower portion of the tubular mast portion 32 and is sealed relative thereto. The coupling 43 is shown as including a cylindrical intermediate shell 44 connected to inwardly tapering end portions 45. The cylindrical portion 44 is of substantially larger diameter than the mast portion 31 and the mast is provided with opposed apertures 46 through which water may be pumped from the interior of the coupling. Sealing rings 47 which are generally V-shaped in cross section are held at opposite ends of the tapering coupling sections 45 by retaining rings or shoulders 49 secured to the inner surface of these sections 45. The seals 47 are arranged so as to expand when subjected to water pressure so as to form a seal between the ends of the coupling 43 and the mast section 31, while still permitting free rotation of the mast.

Figure 11:
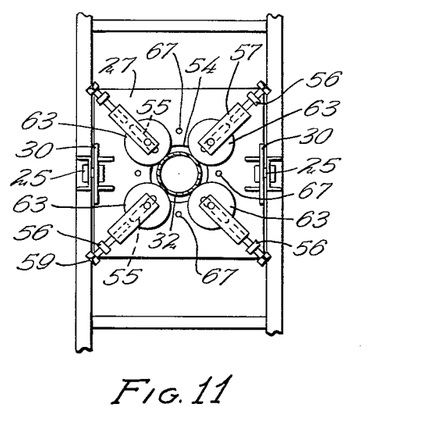
FIGURE 11 is a sectional view on a horizontal plane through the mast, illustrating the upper end of the mast supporting frame, the section being indicated by the line 11—11 of FIGURE 10.
Figure 12:
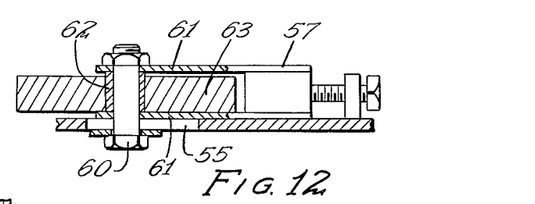
FIGURE 12 is a sectional view through a detailed portion of the structure illustrated in FIGURE 11.

A tubular inlet 50 extends radially from the intermediate coupling section 44 and is provided with a mounting flange 51 which may be bolted to a tubular extension 52 by means of bolts 53. The tubular extension 52 is adapted to be coupled to the end of an irrigation pipeline or other water supply conduit. By detaching the extension 52, the coupling 43 may be rotated about the axis of the mast portion 31 so that the water supply line may connect with the coupling from a different direction. As indicated in FIGURES 11 and 12 of the drawings, the upper plate 27 of the mast supporting frame 24 is provided with a central aperture 54 which is of a diameter somewhat larger than the outer diameter of the tubular mast section 32. The plate 27 is provided with a series of elongated slots 55 extending therethrough in a diagonal direction toward any corners of the plate 27.

Lugs 56 extend upwardly from the plate 27, the lugs extending diagonally of the corners of the plate. U-shaped clevises 57 are slidably supported on the surface of the plate and are moveable in a radial direction toward and away from the corners of the plate 27 by adjustment bolts 59 which are threaded through the lugs 56 and extend into sockets in the ends of the clevises. As indicated in FIGURE 12 of the drawings, a bolt 60 extends upwardly through the slot 55 and through the arms 61 of the corresponding clevis 57. A spacing sleeve 62 extends between the arms, encircling the shank of the bolt 60 and forming a bearing for a roller 63. As is indicated in FIGURE 11 of the drawings, the four rollers 63 are thus supported for movement in a diagonal direction and these rollers engage the mast portion 32 with sufficient pressure to hold the mast in an upright position while permitting free rotation of the mast. The position of the roller 63 may be regulated if desired to properly align the mast 32 with the supporting bearing 37.

Figure 7:
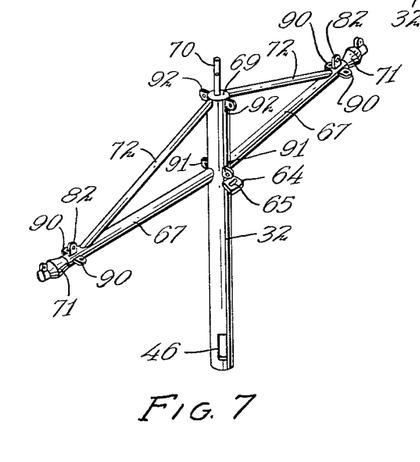
FIGURE 7 is a perspective view of the lower portion of the mast detached from the mast support.

As indicated in FIGURES 7 and 10 of the drawings, a lug 64 extends outwardly from the mast portion 32 and is provided with an aperture 65 designed to accommodate a locking pin 66. The locking pin 66 is designed to extend through the lug 64 and into any of the angularly spaced apertures 67 in the plate 27. The lug 64 and the opening 67 are so located that the mast is held in one of four rotative positions. In two of these positions, the booms extend longitudinally of the chassis while in either of the other two positions, the booms extend laterally thereof.

As is indicated in FIGURE 7 of the drawings, the mast portion 32 supports a pair of oppositely disposed boom ends 67 each of which incline upwardly and outwardly from the mast portion 32. The boom base members 67 are hollow and communicate with the interior of the hollow mast portion 32 to receive water therefrom. A top closure plate 69 closes the upper end of the hollow mast portion 32 and a pin 70 extends axially from the closure plate 69. Thus fluid which is pumped upwardly through the mast portion 31 is directed outwardly through the two arms 67, the water being divided equally between the two booms. A coupler 71 is provided at the end of each of the boom base members 67 for accommodation of the next adjacent boom section.

Figure 2:
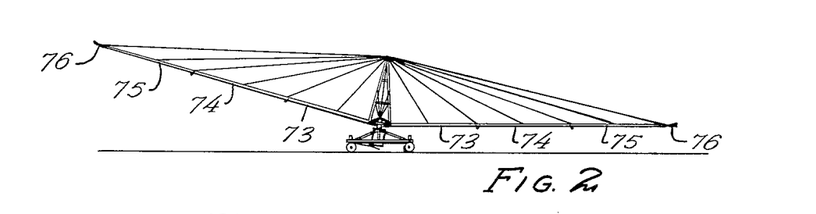
FIGURE 2 is a side elevational view of the sprinkler illustrated in FIGURE 1 with the mast tilted so that one of the booms is substantially parallel to the ground.

In order to assist in supporting the boom base portions 67, diagonal braces 72 are secured to the upper end of the mast portion 32 and to the boom base portion 67 near the outer extremity thereof. The number of tubular boom sections which are employed is somewhat of a matter of choice. FIGURES 1 and 2 of the drawings disclose inner boom sections 73 which are attached to the boom base sections 67 by the couplings 71, as illustrated in FIGURE 15 of the drawings. The boom arms D also include intermediate sections 74 and outer boom sections 75. The various sections are connected together by couplers similar to the couplers 71 which are located at the ends of all of the sections except the outermost sections 75. Nozzles 76, not illustrated in detail, are provided on the outer ends of the outer boom sections 75 to increase the area which is watered by the sprinkler.

Figures 9, 22:
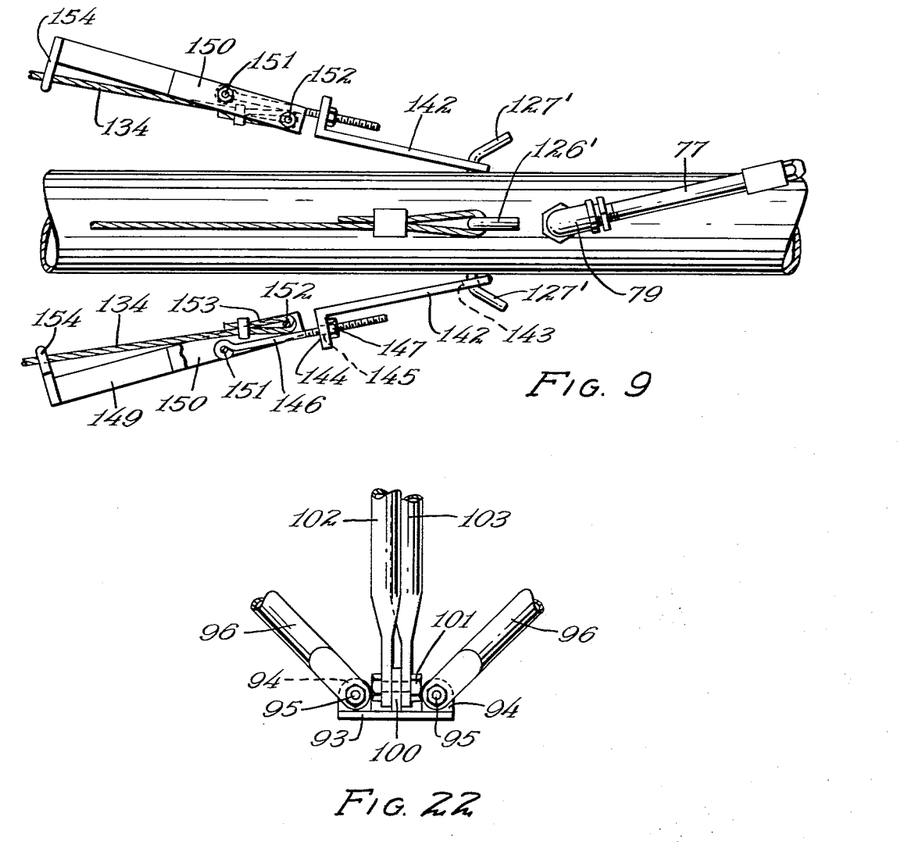
FIGURE 9 is a top plan view of one of the sprinkler heads used upon the boom.
FIGURE 22 is a bottom plan view of a portion of one of the brace structures.

The various boom sections are provided with nozzles such as 77 in FIGURE 9 of the drawings which are connected to the upper surfaces of the sections at any desired location by means of elbows which are threaded into elbow 79 communicating with the interior of the hollow booms. The individual boom sections are supported by cables extending outwardly and downwardly from the upper mast portion 81 which is perhaps best illustrated in FIGURE 1 of the drawings.

The upper mast portion 81 is a detachable structure which extends upwardly from the outer ends of the boom base portions 67. Lugs 82 (see FIGURE 7) extend upwardly from the outer ends of the boom base sections 67 and are bolted or otherwise secured to upwardly projecting A-frame members 83 which are connected at their upper ends 84. Cross braces 85 and 86 connect the arms 83 and braces 87 arranged in V-shaped relation are bolted to the outer ends of the lower cross member 86 and to the shaft or lug 70 at the top of the mast portion 32. The A-shaped frame 81 forming the upper mast portion is held in vertical position by means of the brace assembly 89 illustrated in FIGURES 8 and 22 of the drawings, one such brace element 89 being positioned on each side of the lower mast portion 32.

As indicated in FIGURE 7 of the drawings, each boom base portion 67 is provided with a pair of laterally projecting lugs 90 near the outer extremity thereof. The mast portion 32 is provided with a pair of opposed vertical lugs 91 projecting therefrom on a plane at right angles to a plane through the axis of the mast and through the boom base portions 67. A second pair of similarly directed ears or lugs 92 are provided near the upper extremity of the mast portion 32.

Each brace member 89 includes an anchoring plate 93 having a pair of substantially horizontal lugs 94 projecting in spaced relation therefrom. The lugs 94 extend at substantially right angles to the plate 93 and are apertured to accommodate bolts 95 which serve to connect the plate 93 to the outer ends of diverging braces 96. One of the arms 96 is provided with a flattened end 97 designed for attachment to a lug 90 to the left of the mast 32 as viewed in FIGURE 7, while the other arm 96 is provided with a flat end 99 designed for attachment by bolts or the like to the lug 90 on the boom base member 67 to the left of the mast 32.

Figure 8:
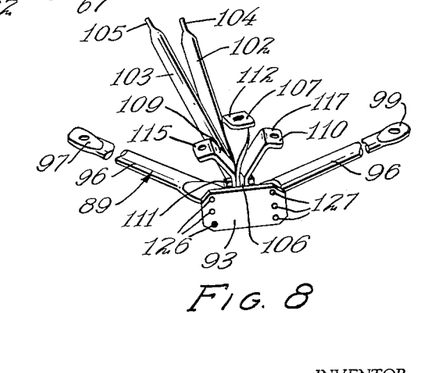
FIGURE 8 is a perspective view of one of the brace structures.

The plate 93 also includes a vertically extending right angular lug 100 to which are bolted as at 101 a pair of braces 102 and 103. The brace 102 extends in a generally horizontal direction and a flattened end 104 on the brace 102 is anchored to the lug 91 on the corresponding side of the mast. The other brace 103 angles upwardly and is bolted or otherwise secured to the lug 92 on the corresponding side of the mast, the bolt extending through the flattened end 105.

In effect, the plate 93 is supported from lateral movement by the brace arms 96 which form a triangular frame when connected to the boom base members 67. The plate 93 is held from vertical movement by the braces 102 and 103 which, when connected to the mast portions 32 form a triangular brace structure. Thus the plates 93 are held in fixed relation to the mast portion and to the boom.

Figures 3, 4, 5:
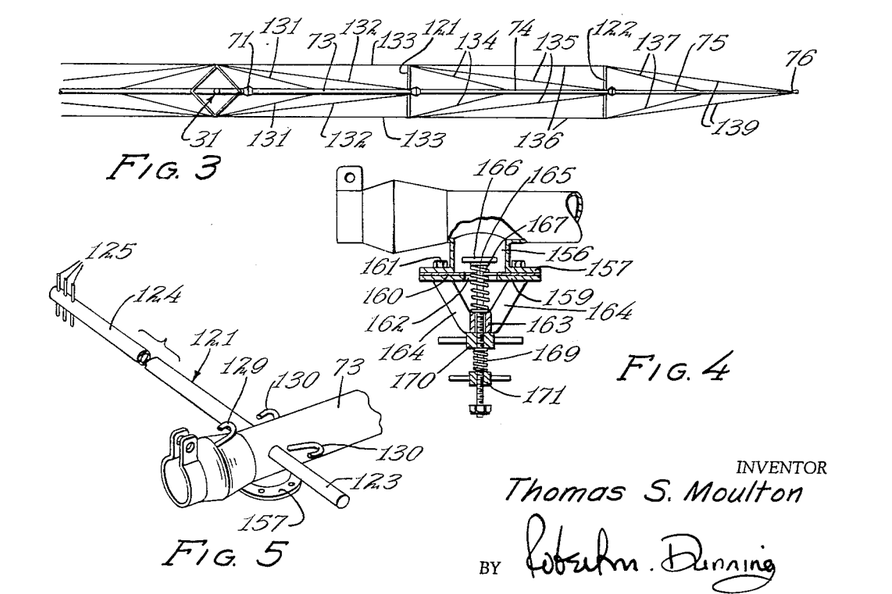
FIGURE 3 is a diagrammatic top plan view showing the boom bracing arrangement.
FIGURE 4 is an elevational view, partly in section showing a valve which may be employed to empty the boom at the completion of the sprinkling operation.
FIGURE 5 is a perspective view of a portion of one of the boom sections, showing the coupling and transverse brace supports.
Figure 6:
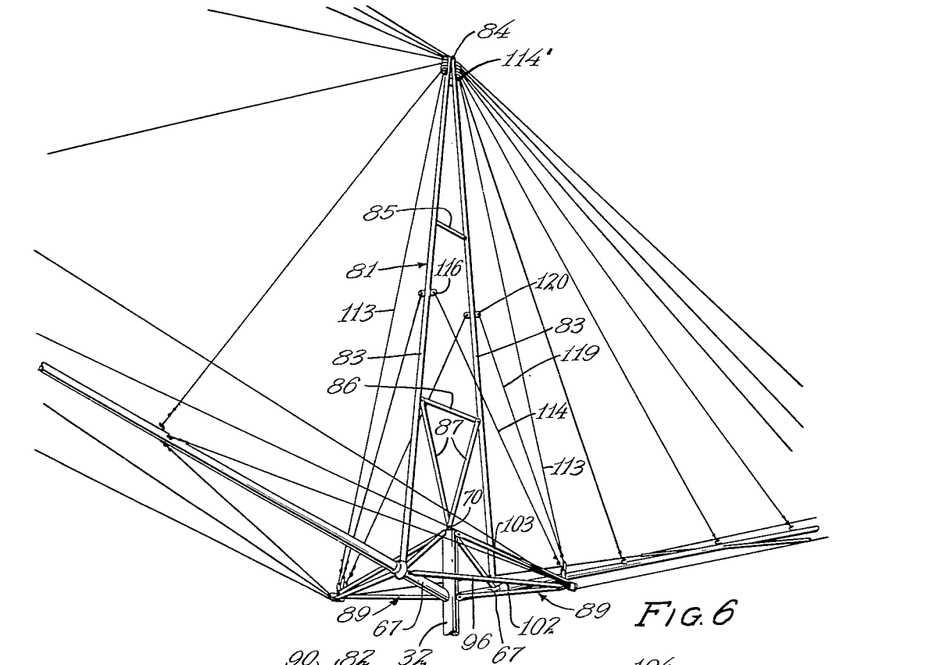
FIGURE 6 is a perspective view of the upper portion of the mast and illustrating the manner in which the boom is supported therefrom.

A vertical lug 106 secured to the plate 93 supports an intermediate bracket arm 107 and two outwardly diverging bracket arms 109 and 110. The lower ends of the bracket arms are parallel and are attached to the lug 106 by a bolt 111. The upper ends of the bracket arms are bent into angular relation with the lower portions thereof, the end 112 of the bracket arm 107 being bent into a plane substantially normal to the direction of the guy cable 113 to which it is attached and which is connected at its upper extremity to an attachment plate 114', not illustrated in detail in the drawings. When the two cables 113 from the opposite brace units 89 are attached to the upper end of the mast portion 81, this member is held in vertical position. To assist in maintaining the mast portion 81 in vertical position, a cable 114 is anchored to the angularly turned end 115 of the bracket arm 109 and is connected to a lug 116 on one of the frame members 81 about half way up this member. The bracket end 115 is bent to extend substantially normal to the direction of the cable 114. A similarly angularly bent end 117 on the bracket arm 110 is connected by a cable 119 to a corresponding lug 120 on the other converging frame member 83. As is indicated in FIGURE 3 of the drawings in diagrammatic form, each of the boom sections 73 and 74 is provided with a transverse brace extending laterally in opposite directions therefrom, the brace attached to the section 73 being indicated at 121, and the brace of each boom section 74 being indicated at 122. As indicated in FIGURE 5, each of these braces such as the brace 121, includes a transverse rod 123 which extends through the hollow tubular boom section to extend diametrically therefrom. Tubular extensions 124 extend to each side of the boom section, one such extension being omitted in FIGURE 5 so that the rod 123 may be seen. The extensions 124 may be anchored in place or may be removable and frictionally engaged on the rod 123. Spaced pins 125 are provided near the outer ends of the arms 124 to provide a simple means of preventing the cables attached to the arms from sliding longitudinally of the arms.

Each of the plates 93 of FIGURE 8 is provided with three vertically spaced openings 126 adjacent one end of the plate and three similar openings 127 adjacent the other end thereof. Cables which are diagrammatically illustrated in FIGURE 3 are anchored in the apertures 126 and 127, the cables anchored in the apertures 126 extending toward one arm of the boom and the apertures 127 providing an anchor for the cables extending to the other arm of the boom. In view of the fact that the cable arrangement extending to each arm of the boom is identical, the cables extending to one side only of the central mast 31 shown in FIGURE 3 show that the diagram can be shown on a larger scale.

As is indicated in FIGURE 9 of the drawings, each section is provided intermediate its length with an outwardly and upwardly directed hook end 126' and a pair of laterally and outwardly directed hooks 127'. As is indicated in FIGURE 5 of the drawings, the outer end of each of the sections is provided with an upwardly and outwardly directed hook 129 and a pair of laterally and outwardly directed hooks 130. The various cables supporting the boom arms are connected to the various boom sections through the use of these hooks.

In order to hold the boom arms from lateral deflection, cables 131 extend from apertures 126 or 127 to the hooks 127' of the innermost boom sections 73 intermediate the ends of these sections. A second pair of cables 132 are anchored to the plate 93 and extend to the hooks 130 near the outer extremity of each inner boom section 73. Cables 133 extend from each plate 93 to the outer ends of the cross arm 121 at the outer end of the inner section 73.

One pair of cables 134 extend from the ends of the cross arm 121 to hooks 127' intermediate the ends of the intermediate boom section 74. A second pair of cables 135 extend from the outer end of the cross arm 121 to the hooks 130 at the outer end of the intermediate section 74. A third pair of cables 136 extend from the outer end of the cross arm 121 to the outer arms of the cross arm 122.

A pair of cables 137 extend from the outer ends of the cross arms 121 to hooks 127' intermediate the ends of the outermost boom section 75. A second pair of cables 139 extend from the outer ends of the cross arm 122 to the hooks 130 at the outer end of the outermost section 75. Thus the various sections are held from lateral deflection.

As is indicated in FIGURES 1 and 2 of the drawings, cables connect the hooks 126' intermediate the ends of the sections and hooks 129 at the ends of the sections to the top of the mast C or to the brackets 114'. For the purpose of simplicity, the cables extending from the top of the mast to support the boom sections intermediate their ends are indicated by the numeral 140, and the cables which connect the top of the mast to the outer ends of the sections are indicated at 141.

In order to quickly tighten and loosen the various cables, the tightening apparatus illustrated in FIGURE 9 of the drawings may be employed. A bracket plate 142 is provided with an aperture 143 at one end and an angularly turned opposite end 144 having an aperture 145 therein. An eye bolt 146 extends through the aperture 145 and is adjustably supported by a nut 147. The eye bolt is pivotally connected intermediate the ends of a lever 149 having a bifurcated end 150 by means of a pivot bolt 151 extending through the bifurcated end and through the eye of the eye bolt 146.

The lever arm 149 is provided at one end with a bolt or pin 152 through which the loop end 153 of the cable 134 is anchored. A hook 154 is provided at the opposite end of the lever 149 designed to engage about the cable 134.

When the lever arm 149 is in the position illustrated, the cable is tight. By flexing the cable 134 sufficiently to disengage the hook 154 from the cable, the hook bearing end of the lever arm swings about the pivot 151 in a counterclockwise direction as viewed in FIGURE 9 at the bottom of the view or in a clockwise direction as viewed in the upper portion of the view to disengage the cables 134 or loosen the cables so that they may be readily disengaged.

Due to the fact that the boom arms are of considerable length and may be of considerable diameter, particularly near the inner ends of the booms, the boom arms hold a considerable weight of water. If the water drains from one arm of the boom more quickly than from the other arm thereof, it is possible to tilt the structure, particularly when the booms are extending laterally from the chassis. As an example, if one of the arms happens to be tilted upwardly at a greater angle than the other at the time the water supply is cut off, the water will drain from the steeper of the two arms more quickly than from the other arm. In order to obviate any chance of tilting the apparatus, I provide automatic drain valves in the boom arm which may be of the type illustrated in FIGURE 4 of the drawings.

Downwardly extending outlet pipe 156 terminates in a mounting flange 157 which supports a valve plate 159. A gasket 160 is secured between the plate 159 and the flange 157 by the bolts 161. Apertures 162 extend axially through the plate 159 and gasket 160.

An outboard bearing 163 is supported by arms 164 in axially aligned relation to the sleeve 156. The bearing 163 slidably supports a valve rod 165 having a valve 166 at its upper extremity. The valve 166 is designed to seat against the upper surface of the gasket 160 to close the valve. A spring 167 interposed between the bearing 163 and the valve 166 normally holds the valve in open position.

The action of the spring 167 is substantially counterbalanced by a spring 169 interposed between a nut 170 threaded upon the valve rod 165 and a second hand operated nut 171 also threaded on the valve rod. The nut 170 limits the opening of the valve 166, while the nut 171 controls the tension of the spring 169 so as to produce the proper balance of pressure between the two springs.

The valve is so arranged that when water under pressure is pumped into the boom, the pressure acts against the valve 166 to hold it in closed position. However, when the water pressure is turned off, the valve is designed to open and to permit the water to drain out quickly enough to prevent any danger of having one arm of the boom be sufficiently heavier than the other to tilt the apparatus. The valves may be provided in each section or at proper intervals through the length of the boom in order to accomplish the desired result.

In describing the chassis B, I have described a manner in which the mast supporting frame 24 is pivotally supported. In FIGURES 15, 19 and 20 I have disclosed the mechanism for tilting the frame 24 as shown in FIGURE 15, an angular arm 172 is pivotally supported by a transverse pivot 173 to a lug 174 on the chassis frame. The arm 172 is slotted longitudinally as indicated at 175. A bolt 176 extends laterally from a downward projection 177 at the bottom of the frame 24. This bolt 176 extends through the slot 175 and a hand operated nut 179 is provided on the bolt to lock the frame 124 in an adjusted position.

Figure 21:
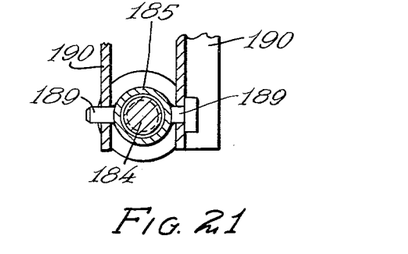
FIGURE 21 is a sectional view through a portion of the mast support tilting mechanism, the position of the section being indicated by the line 21—21 of FIGURE 19.

As seen in FIGURES 19 and 20, an internally threaded sleeve 180, or a sleeve having an internally threaded nut 181 secured thereto is provided with a flat end 182 including an aperture 183 through which the bolt 176 may extend. The sleeve 180 is designed to accommodate a threaded shaft 184 which also extends through a sleeve 185 having flanged ends 186 to which internally threaded nuts 187 are welded. As indicated in FIGURES 19 and 21, the sleeve 185 is provided with diametrically opposed radially extending pivots 189 which are pivotally engaged in brackets 190 extending downwardly from the center portion of the chassis frame.

A T-shaped handle 190' is provided with a hollow tubular shank 191 which fits over an end of the threaded shaft 184 and which may be detachably connected thereto by means of a bolt 192. The handle 190' may be employed for rotating the threaded shaft 184.

Rotation of the shaft 184 moves the sleeve 182 in one direction or the other, thus tilting the mast supporting frame 24 about the axes of the pivots 25.

From the foregoing description, it will be understood that the boom arms of the apparatus are extremely long, and accordingly the mast should be as nearly vertical as it is practical before the sprinkler is put into operation. As indicated in FIGURE 14 of the drawings, the chassis B includes a pair of transversely elongated wheel supporting frames 193 which are shown as rectangular hollow beams formed by two abutted channels, as indicated in FIGURE 16 of the drawing. Wheel supports 194 act to support the wheels 195 on parallel horizontal axes. The wheel supports 194 are pivoted to the ends of the frame 193 on substantially vertical axes 196 and steering arms 197 extend forwardly from the supporting frames 193, or outwardly of these frames from the center of the chassis.

As indicated in FIGURES 14 and 15, a pair of channels 199 and 200 project forwardly or outwardly from each end of the chassis from the frame 193. The channels 199 and 200 are spaced to accommodate a pivot plate 201 which is hinged between the channel by a vertical pivot 202. The pivot plate 201 may be provided with a transverse hinge bearing 203 to which a draw bar 204 may be attached. Channels 199 and 200, as well as the pivot plate 201, are provided with vertically aligned apertures 205 which may accommodate a locking pin to hold the plate 201 at one end of the chassis from pivotal movement.

The pivot plate 201 is pivotally connected at 206 to arms 207, the other end of which are pivotally connected at 209 to the steering arms 197. Thus pivotal movement of the pivot plate 201 will act to steer the end of the chassis to which the draw bar is attached when the locking pin 205 is removed, while the pivot plate 201 at the opposite end of the chassis may be locked from pivotal movement.

As indicated in FIGURES 17 and 18 of the drawings, brackets 210 are secured to the side frame members 10 and 11 and include internally threaded bearing portions 211 which extend outwardly to a point beneath the transverse wheel frame members 193. The end members 12 and 13 of the center chassis portion are pivotally secured to the transverse center of the wheel frame members 193 by pivot bolts 212. Threaded bolts 213 extend upwardly through the bearings 211 and engage against the under surface of the wheel frame member 193.

By loosening the pivot bolt 212 slightly, and manipulating the bolts 213 by their cross bars 214, the bolts 213 may hold the wheel frame member 193 in angular relation to the frame ends 12 and 13 of the central portion of the frame. Thus the central frame member may be leveled transversely in the event one or both wheels on one side of the chassis are above the level of the wheels on the other side. The mast may be adjusted into vertical position longitudinally of the frame by adjustment of the pivotal position of the mast supporting frame 24.

The arrangement which has been described has certain definite advantages over structures previously employed for the same purpose. For example, the sprinklers of the general type illustrated are normally difficult to disassemble due to the length and elevation of the arms of the boom. In the present structure, the desired result is accomplished by locking the mast from rotation with the boom arms extending longitudinally of the chassis as indicated diagrammatically in FIGURE 2. The mast supporting frame is then tilted in one direction until the arm shown on the right of the drawing is close to the ground. With the boom in this position, the outer section 75 of the lowered arm is removed by merely disengaging the cables from their hooks and disengaging the section from the coupling of the next section.

The mast is then pivoted in the opposite direction until the arm of the boom which is to the left of the mast in FIGURE 2 is close to the ground. The outermost two sections 75 and 74 may then be removed. When the mast is tilted back into the position shown in FIGURE 2, the remaining sections 74 and 73 may be removed from the right hand side of the mast and by finally tilting the mast to lower the left hand boom arm, the final section 73 of this boom arm may be removed.

This assembly and disassembly method is permissible because of the fact that the sections are made of tubing which is as light as is practical to provide the necessary strength, and as the mast is supported at the longitudinal center of the chassis which provides the greatest stability for the structure.

In accordance with the patent statutes, I have described the principles of construction and operation of my improvement in rotary boom sprinklers, and while I have endeavored to set forth the best embodiment thereof, I desire to have it understood that changes may be made within the scope of the following claims without departing from the spirit of my invention.

I claim:

1. A rotary boom support for use with a rotary boom having a hollow mast, the support including an elongated chassis, a generally vertical elongated mast supporting frame pivotally connected adjacent its upper end to said chassis, the axis of pivotal connection extending transversely of the longitudinal axis of said chassis, means rotatably supporting the hollow mast within said frame for rotation about its axis, the mast extending to the lower end of said frame, a closed lower end on said mast, a thrust bearing on the lower end of said frame supporting the closed lower end of said mast, water supply means connected to said mast adjoining the closed lower end thereof, and adjustment means connecting said frame and said chassis for pivotally adjusting said frame about the axis of pivotal connection.

2. The structure of claim 1, and in which said water supply connection means includes a hollow coupling encircling the hollow mast near the lower end thereof, said coupling being rotatable relative to the mast, said coupling having a water inlet in the wall thereof, said mast having openings therethrough inwardly of said coupling.

3. The structure of claim 1 and in which said water supply connection includes a hollow coupling encircling said mast and rotatable relative thereto, and a water inlet connection in the wall of said coupling, said mast having openings therethrough within said coupling.

4. A support for a rotary boom sprinkler provided with a hollow mast having a closed lower end, the support including an elongated chassis, a pair of frame members extending upwardly from opposite longitudinal sides of said chassis, a mast supporting frame pivotally secured between said frame members along transversely aligned pivots, said frame normally depending from said pivots, a bearing plate at the bottom of said frame, a thrust bearing supported by said bearing plate, an axial shaft extending downwardly from the closed end of said mast and extending through said bearing and said bearing plate, means on said shaft for retaining the same in position, the closed lower end of said mast being supported by said thrust bearing, a plate at the upper end of said frame having an aperture therethrough of a size somewhat greater than the diameter of said mast, a series of angularly spaced rollers mounted on said last mentioned plate and engaging said mast to hold said mast in proper relation to said bearing and a water supply connection to said mast above the lower end thereof.

5. The structure of claim 4 and including means supporting said rollers for radial movement toward and away from the axis of said mast.

6. The structure of claim 4 and including cooperable means on opposed hollow booms communicatively connected to said mast and on said last named plate for selectively locking said mast from rotation.

7. The structure of claim 6 and in which the locking means may hold said mast from rotation while said booms are either extending longitudinally of said chassis, or transversely thereof.

8. A rotary boom support for use with a rotary boom having a hollow mast, the support including a chassis, a hollow cylindrical mast having a closed lower end, a thrust bearing carried by said chassis supporting the closed lower end of said mast, means constraining an upper portion of said mast for rotation about a generally vertical axis while said mast is supported on said thrust bearing, a shell member having upper and lower tapering ends circumscribing the lower portion of said mast to provide a water jacket therebetween, the circumscribed portion of said mast having at least one radially directed aperture for the entrance of water from said shell into said mast.

9. The structure of claim 8 including V-shaped sealing rings retained in the tapering ends of said shell for sealing said ends with respect to said mast.

References Cited in the file of this patent
UNITED STATES PATENTS

| | | |
|---|---|---|
| 1,299,380 | Plumer | Apr. 1, 1919 |
| 1,328,048 | Knapp | Jan. 13, 1920 |
| 1,672,588 | Turnidge | June 5, 1928 |
| 2,711,803 | Hurst | June 28, 1955 |
| 2,750,228 | Engel | June 12, 1956 |
| 2,929,597 | Ruggieri et al. | Mar. 22, 1960 |
| 2,964,247 | Maasdam | Dec. 13, 1960 |